United States Patent
Shimizu et al.

(10) Patent No.: US 8,338,033 B2
(45) Date of Patent: Dec. 25, 2012

(54) NONAQUEOUS LITHIUM SECONDARY BATTERY

(75) Inventors: Masao Shimizu, Hitachi (JP); Yoshiaki Kumashiro, Kasama (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 12/850,792

(22) Filed: Aug. 5, 2010

(65) Prior Publication Data

US 2011/0033754 A1 Feb. 10, 2011

(30) Foreign Application Priority Data

Aug. 7, 2009 (JP) ................................ 2009-183964

(51) Int. Cl.
H01M 4/58 (2010.01)

(52) U.S. Cl. ................................ 429/231.95; 429/231.1

(58) Field of Classification Search .................. 429/218, 429/194, 223, 224, 231.95, 231.1, 231.6, 429/232

See application file for complete search history.

(56) References Cited

U.S. PATENT DOCUMENTS

| | | | |
|---|---|---|---|
| 6,365,299 | B1 | 4/2002 | Miyaki et al. |
| 6,432,585 | B1 * | 8/2002 | Kawakami et al. ............ 429/233 |
| 2008/0138700 | A1 * | 6/2008 | Horpel et al. ................. 429/129 |
| 2009/0169985 | A1 * | 7/2009 | Yamaguchi et al. .......... 429/129 |

FOREIGN PATENT DOCUMENTS

| | | |
|---|---|---|
| JP | 7-220759 | 8/1995 |
| JP | 2005-327680 | 11/2005 |
| JP | 2008-159333 | 7/2006 |
| JP | 2008-27879 | 2/2008 |
| JP | 2008041465 A * | 2/2008 |
| WO | WO 97/01870 | 1/1997 |

OTHER PUBLICATIONS

Official Action issued on Dec. 27, 2011, in connection with Japanese Application No. 2009-183964; 3 pages; Japanese Patent Office, Japan.

* cited by examiner

*Primary Examiner* — Jennifer K Michener
*Assistant Examiner* — Monique Wills
(74) *Attorney, Agent, or Firm* — Antonelli, Terry, Stout & Kraus, LLP.

(57) ABSTRACT

A nonaqueous lithium secondary battery includes a positive electrode and a negative electrode capable of intercalating and releasing lithium ions and a separator. The negative electrode includes a collector and a negative electrode mixture layer formed on the collector. The negative electrode mixture layer includes at least a negative electrode active material and a binder. Nonconductive particles are buried in a top layer of the negative electrode mixture layer. The nonconductive particles and the negative electrode active material exist as a mixture in the top layer with a depth ranging from 1 to 20 µm. A volume ratio of nonconductive particles having a diameter equal to or less than 20 µm to a total volume of all the nonconductive particles and the negative electrode active material existing in the top layer of the negative electrode mixture layer ranges from 20 to 80%.

7 Claims, 2 Drawing Sheets

NONAQUEOUS LITHIUM SECONDARY BATTERY

BACKGROUND OF THE INVENTION

The present invention relates to a lithium secondary battery which is capable of suppressing reduction in capacity due to charge/discharge cycles and has an efficient charge/discharge cycle property.

From a point of view of environmental problems, attention has been attracted to the lithium secondary battery as a battery for electric vehicles and a battery to store electric power. For such uses, the battery requires a high energy density and a long life of more than 1000 cycles of repetitive charge and discharge operations. To obtain a high energy density, the lithium secondary battery conventionally employs graphite materials for its negative electrode. This, however, leads to a drawback that the cycle life of the battery becomes shorter.

In operation of the lithium secondary battery, lithium ions reciprocate between a negative electrode and a positive electrode opposing thereto through an electrolyte and a separator. During this, due to decomposition and formation of the electrolyte and/or reaction and formation between the electrolyte and the negative electrode, a highly resistive film of LiF, $Li_2CO_3$, LiOH, or the like is generated and deposited on a surface of the negative electrode. As a result, the internal resistance of the lithium secondary battery becomes higher and movement of lithium ions is hindered, leading to a reduction in the charge/discharge capacity. By observing the surface of the negative electrode, it has been confirmed that the negative electrode is covered with the highly resistive layer. Hence it is recognized that prevention of the generation of the continuous highly resistive layer effectively suppresses the reduction in the charge/discharge capacity.

To remove the problem of the reduction in the charge/discharge capacity of the lithium secondary battery, JP-A-2008-159333 describes a technique in which in a nonaqueous lithium secondary battery including a positive electrode and a negative electrode which are capable of intercalating and releasing lithium ions and a porous film which separates the positive electrode from the negative electrode, a ceramic coating layer is disposed on a surface of the negative electrode. Also, JP-A-2005-327680 describes a technique in which inorganic oxide fillers are disposed similarly on a surface of the negative electrode. These techniques will be essential to the improvement of the safety and reliability of the nonaqueous lithium secondary battery. Further, WO97-01870 describes a technique in which a mixed layer including particles of active material and particles of inorganic oxide is formed on a surface of the negative electrode.

SUMMARY OF THE INVENTION

However, these techniques are accompanied by problems as below. Graphite particles are employed as the active material of the negative electrode. During the charge/discharge cycles, a continuous highly resistive film of inorganic oxide is formed so that a surface of a mixture layer of the negative electrode is covered with the resistive film. Therefore, the transfer of lithium ions between the positive and negative electrodes is apt to be hindered. There is the possibility that the charge/discharge capacity of the lithium secondary battery is remarkably lowered. According to the technique of WO97-01870, a mixed layer including active material particles and inorganic oxide particles is formed in a mixture layer of the negative electrode. Since randomly isolated nonconductive particles are mixed in the mixed layer, there is the possibility that the mixed layer has high resistance. Such high resistance leads to the problem of the reduction in the charge/discharge capacity.

It is therefore an object of the present invention to provide a nonaqueous lithium secondary battery which is capable of suppressing the reduction in the capacity due to the charge/discharge cycles and which has an efficient charge/discharge cycle property.

The nonaqueous lithium secondary battery of the present invention basically has the following properties.

The nonaqueous lithium secondary battery includes a positive electrode and a negative electrode capable of intercalating and releasing lithium ions and a separator for separating the positive electrode from the negative electrode. The negative electrode includes a collector and a negative electrode mixture layer formed on the collector, the negative electrode mixture layer including at least a negative electrode active material and a binder. At least nonconductive particles or nonconductive particles having cluster structure are buried in a top layer of the negative electrode mixture layer. The nonconductive particles and the negative electrode active material exist as a mixture in the top layer.

Among the nonconductive particles existing in the top layer of the negative electrode mixture layer, a volume ratio of nonconductive particles having a diameter equal to or less than 20 μm ranges from 20 to 80% in comparison with a total volume of all the nonconductive particles and the negative electrode active material existing in the top layer of the negative electrode mixture layer.

The nonconductive particles and the negative electrode active material exist as a mixture in the top layer with a depth ranging from 1 to 20 μm.

Also, the nonaqueous lithium secondary battery of the present invention is a nonaqueous lithium secondary battery including a positive electrode and a negative electrode capable of intercalating and releasing lithium ions and a separator for separating the positive electrode from the negative electrode. The negative electrode includes a collector and a negative electrode mixture layer formed on the collector, the negative electrode mixture layer including at least a negative electrode active material and a binder. Nonconductive particles and gaps exist as a mixture on a surface of the negative electrode mixture layer. The nonconductive particles are bound on the surface of the negative electrode mixture layer. Among the nonconductive particles existing in the top layer of the negative electrode mixture layer, a volume ratio of nonconductive particles having a diameter equal to or less than 20 μm ranges from 20 to 90% in comparison with a total volume of all the nonconductive particles and the gaps existing in the top layer of the negative electrode mixture layer.

The nonconductive particles and the gaps exist as a mixture on the surface of the negative electrode mixture layer, the height of the mixture ranging from 1 to 20 μm.

The nonconductive particles include particles of at least one kind of materials selected from alumina, silica, titania, and zirconia. The separator is a ceramic separator.

According to the present invention, it becomes possible to provide a nonaqueous lithium secondary battery which is capable of suppressing the reduction in the capacity due to the charge/discharge cycles and has an efficient charge/discharge cycle property.

Other objects, features and advantages of the invention will become apparent from the following description of the embodiments of the invention taken in conjunction with the accompanying drawings.

DETAILED DESCRIPTION OF THE EMBODIMENTS

Figure 1:
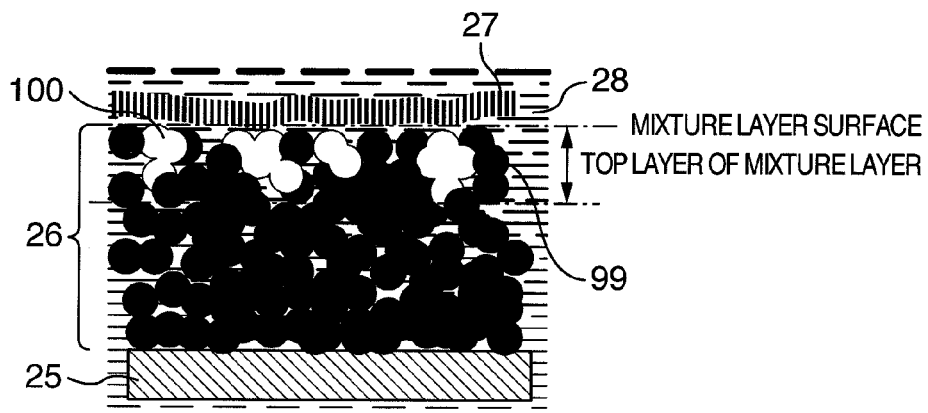
FIG. 1 is a cross-sectional view of a negative electrode including a mixture layer in which nonconductive particles are buried.

The present invention has been devised by giving consideration to two important points, namely, prevention of the creation of the continuous highly resistive film and the small difference in the resistances between the surface of the mixture layer and the inside thereof in the negative electrode.

In the negative electrode of the nonaqueous lithium secondary battery according to the present invention, the nonconductive particles are discontinuously buried in the top or surface layer of the mixture layer. Alternatively, the nonconductive particles and gaps are arranged in a mixed form on a surface of the mixture layer. The highly resistive layer covering the surface of the negative electrode is not easily formed on the nonconductive particles so that it becomes a discontinuous film. Therefore, the lithium ions are not hindered from transferring between the positive and negative electrodes. Since the nonconductive particles exist only in the top layer or on the surface of the mixture layer, the resistance of the mixture layer cannot become higher. It is hence possible to suppress the reduction in the charge/discharge capacity of the lithium secondary battery.

The nonaqueous lithium secondary battery includes a positive electrode and a negative electrode which are capable of intercalating and releasing the lithium ions, a separator to separate the positive electrode from the negative electrode, and an electrolyte. Description will now be given of these constituent components.

Firstly, description will be given of the positive electrode of the nonaqueous lithium secondary battery. The positive electrode includes a positive electrode mixture layer including a positive electrode active material, a conductive additive, and a binder and a positive electrode collector.

The positive electrode active material available for the nonaqueous lithium secondary battery according to the present invention includes an oxide including lithium. As such oxide, it is possible to use oxides having layered structure, for example, $LiCoO_2$, $LiNiO_2$, $LiMn_{1/3}Ni_{1/3}Co_{1/3}O_2$, or $LiMn_{0.4}Ni_{0.4}Co_{0.4}O_2$; a lithium-manganese composite oxide having the spinel structure, for example, $LiMn_2O_4$ or $Li_{1+x}Mn_{2-x}O_4$, or an oxide obtained by replacing a fraction of Mn in the above oxide by another element, e.g., Al or Mg.

The positive electrode active material has a high resistance in general. By mixing carbon powder as a conductive additive with the positive electrode active material, the electric conductivity of the positive electrode active material is enhanced. The positive electrode active material and the conductive additive are in the form of powder. Hence, a binder is mixed therewith to couple the particles of the respective powders with each other to adhere a layer of the powder as a mixture layer onto the positive electrode collector.

The conductive additive may be, for example, natural graphite, artificial graphite, coke, carbon black, or amorphous carbon. When the mean diameter of the particles of the conductive additive is less than that of the positive electrode active material, the conductive additive more easily attaches the surfaces of particles of the positive electrode active material. Hence, the electric resistance of the positive electrode is lowered by use of a small amount of conductive additive. That is, the material of the conductive additive is to be selected according to the mean diameter of the particles of the positive electrode active material.

The positive electrode active material may be any material which is not easily solved in an electrolyte. An aluminum foil is adopted in many cases.

The positive electrode may be produced by a doctor blade method. That is, the collector is coated by use of a blade with a positive electrode slurry in which the positive electrode active material, the conductive additive, the binder, and an organic solvent are mixed with each other. The positive electrode slurry on the collector is heated to dry up the organic solvent to produce the positive electrode through pressure forming by use of a roll press. The positive electrode mixture layer is formed on the collector by drying up the organic solvent of the positive electrode slurry. Through this process, it is possible to produce a positive electrode in which the positive electrode mixture layer is tightly fixed onto the collector.

Next, description will be given of the negative electrode of the nonaqueous lithium secondary battery. The negative electrode includes a negative electrode mixture layer including a negative electrode active material, a conductive additive, and a binder and a negative electrode collector. In some cases, the conductive additive is not employed in the negative electrode mixture layer.

According to the present invention, it is possible to use, as the negative electrode active material of the nonaqueous lithium secondary battery, graphite and amorphous graphite capable of electrochemically intercalating and releasing lithium ions. However, there is no restriction to the kind and material for it as long as the intercalation and release of lithium ions are possible. In general, the negative electrode active material is used in the form of powder in many cases. Hence, a binder is mixed with the negative electrode active material to couple the respective powders with each other. At the same time, the powder layer is adhered as a mixture layer onto the negative electrode collector.

The conductive additive may be natural graphite, artificial graphite, coke, carbon black, or amorphous carbon. In an embodiment described below, carbon black is employed for the conductive additive.

The negative electrode collector is made of a material which does not easily react with lithium to form an alloy, and a copper foil is employed in many cases.

The negative electrode may be produced as below. First, the collector is coated by use of the blade with a negative electrode slurry in which the negative electrode active material, the conductive additive, the binder, and an organic solvent are mixed with each other. The negative electrode slurry on the collector is heated to dry up the organic solvent to produce the negative electrode through pressure forming by use of the roll press. The negative electrode mixture layer is formed on the collector by drying up the organic solvent of the negative electrode slurry. The negative electrode mixture layer is coated with nonconductive particles thereby to bury the nonconductive particles in a top layer of the negative electrode mixture layer. Alternatively, the nonconductive particles are bound on a surface of the negative electrode mixture layer. These processes will be described later.

The separator is comprised of a polymer material, for example, polyethylene, polypropylene, or 4-fluorinated ethylene, and is inserted in a space between the positive and negative electrodes produced as above. The electrolyte is fully held by the separator and the electrodes to secure electric isolation between the positive and negative electrodes thereby to enable the transfer of the lithium ions between the positive and negative electrodes.

For a cylindrical battery, electrodes are formed by a winding operation with the separator inserted between the positive and negative electrodes. In place of the separator, there may be employed a sheet-type solid electrolyte or a gel electrolyte in which a lithium salt or a nonaqueous electrolyte is retained in a polymer, for example, polyethylene oxide (PEO), polymethanol (PMA), polyacrylonitrile (PAN), polyvinylidene floride (PVDF), or polyvinylidene floride-hexafluoropropylene (PVDF-HFP) copolymer. By winding the electrodes around two axes, it is possible to form an electrode group of an elliptic contour.

For a rectangular battery, the positive and negative electrodes are cut out in the form of strips. The strips of positive and negative electrodes are alternately laminated on each other. A polymer separator of polyethylene, polypropylene, or 4-fluorinated ethylene is inserted between the electrodes thereby to produce the electrodes.

For higher safety, the separator may be a sandwiched ceramic separator in which a polymer separator is interposed between layers of electrically-insulating ceramic particles of, for example, alumina, silica, titania, or zirconia. The ceramic separator includes the ceramic particles (nonconductive particles) and a binder.

The present invention is not restricted by the structure of the electrodes described above. The nonaqueous lithium secondary battery according to the present invention is applicable to any structure.

The solvent of the electrolyte may be a mixture including at least one kind of materials selected from propylene carbonate, butyrene carbonate, dimethyl carbonate, ethyl methyl carbonate, diethyl carbonate, methyl acetate, ethyl acetate, propyl acetate, methyl formate, ethyl formate, propyl formate, γ-butyrolactone, α-acetyl-γ-butyrolactone, α-methoxy-γ-butyrolactone, dioxolane, sulfolane, and ethylene sulfite. A favorable electrolyte may be prepared by adding an electrolyte of lithium salt, for example, $LiPF_6$, $LiBF_4$, $LiSO_2CF_3$, $LiN[SO_2CF_3]_2$, $LiN[SO_2CF_2CF_3]_2$, $LiB[OCOCF_3]_4$, or $LiB[OCOCF_2CF_3]_4$ to one kind of the electrolyte described above with a volume density ranging from 0.5 M to 2 M.

To produce the nonaqueous lithium secondary battery, the electrodes thus prepared are inserted in a battery container made of aluminum, stainless steel, or nickel plated steel, and then an electrolyte is penetrated into the electrodes. The battery container may be formed, for example, in a cylindrical, oblate elliptic, or rectangular shape. Any shape of battery container is available only if the electrodes can be installed in the battery container.

Description will now be given of nonconductive particles to be applied onto the negative electrode mixture layer. Alumina, silica, titania, or zirconia is employed for the nonconductive particles. It is favorable that the nonconductive particles are electrochemically stable.

The nonconductive particles may be applied by any general method, for example, a dipping method, a spin coating method, a spraying method, or a flame spraying method. To bury the nonconductive particles in the negative electrode mixture layer, there may be employed a method in which, after applying the nonconductive particles onto the negative electrode mixture layer by, for example, the dipping method, the spin coating method, or the spraying method, the negative electrode is pressed by the roll press. If the flame spraying method or the like capable of burying nonconductive particles is used, it is not required to press the negative electrode.

FIG. 1 is a cross-sectional view illustrating a negative electrode including a mixture layer in which nonconductive particles are buried. The negative electrode includes a negative electrode collector 25 and a negative electrode mixture layer 26 disposed on the collector 25. On a surface of the mixture layer 26, an insulation layer 27 is arranged as a separator to separate the negative electrode from an associated positive electrode. The negative electrode and the insulation layer 27 are soaked in an electrolyte 28.

In a top layer of the mixture layer 26, there exist a negative electrode active material 99 and nonconductive particles 100 as a mixture. As explained above, the nonconductive particles 100 are applied onto the surface of the mixture layer 26 by use of the dipping method, the spin coating method, or the spraying method and are pressed by the roll press to be buried in the top surface of the mixture layer 26. Each of the nonconductive particles 100 may be buried in the top surface of the mixture layer 26 or may be buried in the form of clusters in which a plurality of the nonconductive particles 100 are aggregated. The nonconductive particles 100 exist in a zone with a depth ranging from 1 to 20 μm relative to the surface of the mixture layer 26. That is, the nonconductive particles 100 exist only in this zone of the top layer of the mixture layer 26, and none of the nonconductive particles 100 exists in an internal portion of the mixture layer 26.

Also, by forming fine depressions at the surface of the mixture layer 26 and by applying the nonconductive particles 100 onto the fine depressions, it is possible to bury the nonconductive particles 100 in the fine depressions. The fine depressions may be formed at the surface of the mixture layer 26 by use of a projected mold roll using a nano-print technique, for example, in a gravure method. The fine depressions are favorably formed as depressions with a contour of, for example, a cylinder, a circular cone, or a dome. After applying the nonconductive particles onto the fine depressions thus formed on the surface of the mixture layer in the dipping method, the spin coating method, or the spraying method, the negative electrode is pressed by the roll press.

Figure 2:
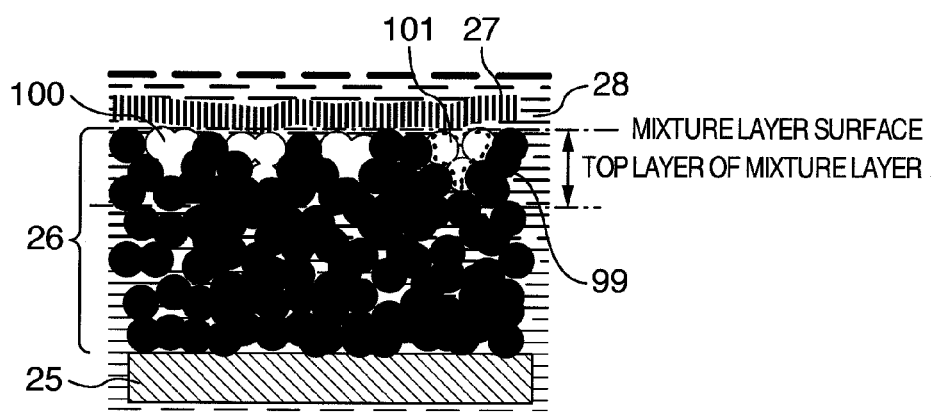
FIG. 2 is a cross-sectional view of a negative electrode in which nonconductive particles are buried in fine depressions formed at a surface of a mixture layer.

FIG. 2 is a cross-sectional view of a negative electrode in which the nonconductive particles are buried in the fine depressions formed on the surface of the mixture layer. In FIG. 2, the same reference numerals as those of FIG. 1 indicate the same or shared constituent components.

In the negative electrode illustrated in FIG. 2, the nonconductive particles 100 are buried in fine depressions 101 of the negative load active material 99 formed at the surface of the mixture layer 26. As FIG. 2 illustrates, the active material 99 and the fine depressions 101 exist as a mixture at the surface of the mixture layer 26. As in FIG. 1, each of the nonconductive particles 100 may be buried in the top surface of the mixture layer 26 or may be buried in the form of clusters in which a plurality of the nonconductive particles 100 are aggregated. The nonconductive particles 100 exist in the fine depressions 101 and hence do not continuously exist at the surface of the mixture layer 26.

Also in this situation, the nonconductive particles 100 exist only in the top layer of the mixture layer 26, and none of the nonconductive particles 100 exist in the internal portion of the mixture layer 26. The nonconductive particles 100 exist in a zone with a depth ranging from 1 to 20 µm relative to the surface of the mixture layer 26.

After applying the nonconductive particles onto the negative electrode mixture layer, the nonconductive particles may be bound on the surface of the mixture layer, namely, the nonconductive particles are not buried in the top layer of the mixture layer. The nonconductive particles may be bound on the surface of the mixture layer in any general method, for example, the dipping method, the spin coating method, and the spraying method. Since the process requires a solution including the nonconductive particles and a binder, it is required to pay attention to the viscosity of the solution. When the viscosity is too high, the nonconductive particles are apt to be not uniformly distributed in the mixture layer.

Figure 3:
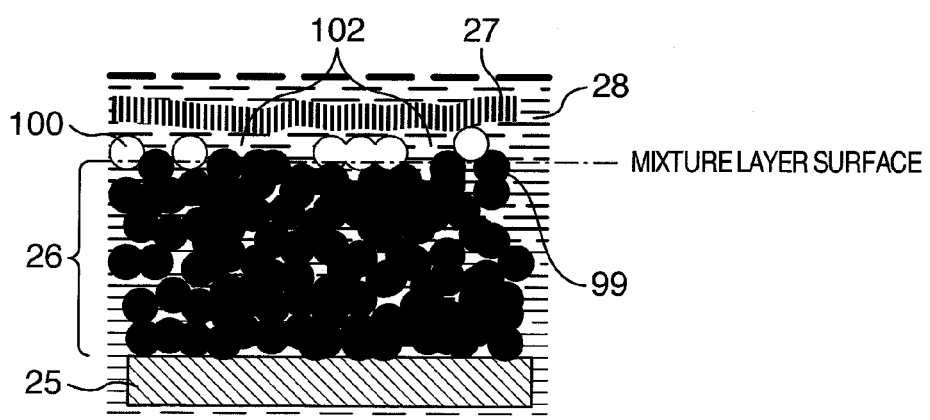
FIG. 3 is a cross-sectional view of a negative electrode in which nonconductive particles are bound on a surface of a mixture layer.

FIG. 3 is a cross-sectional view of a negative electrode in which the nonconductive particles are bound on the surface of the mixture layer. In FIG. 3, the same reference numerals as those of FIG. 1 indicate the same or shared constituent components. In the negative electrode illustrated in FIG. 3, the nonconductive particles 100 are bound on the surface of the negative electrode mixture layer 26. On the surface of the mixture layer 26, there exist gaps 102. Since the nonconductive particles 100 and the gaps 102 exist as a mixture on the surface, the nonconductive particles 100 do not continuously exist thereon. The nonconductive particles 100 exist in a zone with a depth ranging from 1 to 20 µm relative to the surface of the mixture layer 26. Also in this case, none of the nonconductive particles 100 exist in the internal portion of the mixture layer 26.

EXAMPLES

For cycle tests for the characteristics of a nonaqueous lithium secondary battery according to the present invention, coin-type lithium secondary batteries are produced as illustrated in examples 1 to 5 and comparative examples. However, the nonaqueous lithium secondary batteries according to the present invention are not restricted to the examples 1 to 5.

Example 1

Figure 4:
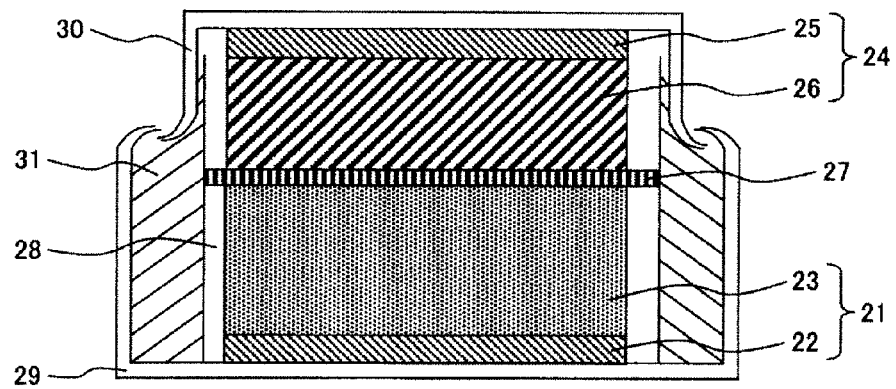
FIG. 4 is a cross-sectional view of a coin-type lithium secondary battery.

FIG. 4 is a cross-sectional view of the produced coin-type lithium secondary battery. The coin-type lithium secondary battery includes a positive electrode 21, a negative electrode 24, an insulation layer 27, an electrolyte 28, a positive electrode can 29, a negative electrode can 30, and a gasket 31. The positive electrode 21 includes a positive electrode collector 22 and a positive electrode mixture layer 23. The negative electrode 24 includes a negative electrode collector 25 and a negative electrode mixture layer 26. The insulation layer 27 is a separator to separate the positive electrode 21 from the negative electrode 24. The positive and negative electrodes 21 and 24 are housed respectively in the positive electrode can 29 and the negative electrode can 30, and then soaked in the electrolyte 28 together with the insulation layer 27. The gasket 31 seals the positive and negative electrode cans 29 and 30 to prevent the leakage of the electrolyte 28. Next, description will be given of production of the positive and negative electrodes 21 and 24 and assembly of the battery.

Positive Electrode Production:

The positive electrode 21 was produced as follows.

In Example 1, the positive electrode active material is $Li_{1.05}Mn_{1.95}O_4$ in the form of particles having a mean particle diameter of 20 µm. The conductive additive is a mixture of natural graphite with a mean particle diameter of 3 µm and a specific surface area of 13 $m^2/g$ and carbon black with a mean particle diameter of 0.04 µm and a specific surface area of 40 $m^2/g$. The weight ratio between the natural graphite and the carbon black is 4:1. The binder is a solution prepared by dissolving a 8 wt % of polyvinylidene floride in N-methylpyrolidone.

The positive electrode active material, the conductive additive, and polyvinylidene floride were mixed with each other with a weight ratio of 90:4:6. The mixture was fully kneaded into a positive electrode slurry. The positive electrode slurry was applied onto one surface of the positive electrode collector 22 including a 20 µm thick aluminum foil. By drying the slurry, the positive electrode mixture layer 23 was formed on the positive electrode collector 22. The positive electrode collector 22 on which the positive electrode mixture layer 23 was formed is pressed by the roll press to produce an electrode. By punching the electrode, a disk-type positive electrode 21 having a diameter of 15 mm was obtained.

Negative Electrode Production:

The negative electrode 24 was produced as follows.

The negative electrode active material was prepared by mechanically mixing graphite having a mean particle diameter of 10 µm with carbon black having a mean particle diameter of 0.04 µm and a specific surface area of 40 $m^2/g$ with a weight ratio of 95 to 5. The carbon black also serves as a conductive additive. The binder was prepared by dissolving a 8 wt % of polyvinylidene floride in N-methylpyrolidone.

The carbon material including the graphite and the carbon black was mixed with polyvinylidene floride with a weight ratio of 90:10. This mixture was fully kneaded into a negative electrode slurry. The negative electrode slurry was applied onto one surface of the negative electrode collector 25 including a 10 µm thick aluminum foil. By provisionally drying the slurry, the negative electrode mixture layer 26 was formed on the negative electrode collector 25.

Alumina particles were applied as nonconductive particles onto the negative electrode mixture layer 26. The aluminum particles were mixed with the binder beforehand prepared by dissolving 8 wt % of polyvinylidene floride in N-methylpyrolidone with a weight ratio of 90 to 10. The obtained mixture was applied onto the negative electrode mixture layer 26 by the spin coating method at a spin coating speed of 120 rpm for 30 seconds, thereby to apply nonconductive particles onto mixture layer 2.

The negative electrode collector 25 on which the negative electrode mixture layer 26 is formed was pressed by the roll press and was then dried to produce an electrode. By punching the electrode, there was obtained a disk-type negative electrode 24 having a diameter of 16 mm.

By observing the surface of the negative electrode 24 by the SEM, it was confirmed that the nonconductive particles are buried only at the top surface of the negative electrode mixture layer 26. It was also confirmed that none of the nonconductive particles exist in the inner layer of the mixture layer 26. By observing the cross sections of the mixture layer 26 by the SEM, it was recognized that nonconductive particles exist in a zone with a depth ranging from 1 to 20 µm relative to the surface of the mixture layer 26.

Battery Assembly:

The nonaqueous lithium secondary battery according to the present invention was assembled as below.

The positive electrode 21 and the negative electrode 24 were arranged respectively in the positive electrode can 29 and the negative electrode can 30. An insulation layer 27 including a 40 µm thick polyethylene porous separator was disposed between the positive electrode 21 and the negative electrode 24. $LiPF_6$ was dissolved in a mixture of ethylene carbonate and ethyl-methyl carbonate (with a volume ratio of 1:2) to obtain a mixture electrolyte 28 containing a 1.0 mol/ dm³ of LiPF₆. The positive electrode can 29 and the negative electrode can 30 were filled with the electrolyte 28. The positive and negative electrode cans 29 and 30 were sealed by the gasket 31 and were insulated from each other.

In this way, the coin-type nonaqueous lithium secondary battery was produced according to the present invention. By using the positive and negative electrodes employed in the battery, a triode cell including an opposing electrode and a reference electrode made of metallic lithium was produced for cycle tests.

Example 2

A coin-type lithium secondary battery produced in Example 2 differs from that of Example 1 only in the structure of the negative electrode 24. Hence, description will be given only of a method of producing the negative electrode 24.

The negative electrode active material was prepared by mechanically mixing graphite having a mean particle diameter of 10 μm with carbon black having a mean particle diameter of 0.04 μm and a specific surface area of 40 m²/g with a weight ratio of 95:5. The carbon black also serves as a conductive additive. The binder was prepared by dissolving a 8 wt % of polyvinylidene floride in N-methylpyrolidone.

The carbon material including the graphite and the carbon black was mixed with polyvinylidene floride with a weight ratio of 90:10. This mixture was fully kneaded into a negative electrode slurry. The negative electrode slurry was applied onto one surface of the negative electrode collector 25 including a 10 μm thick aluminum foil. By provisionally drying the slurry, the negative electrode mixture layer 26 was formed on the negative electrode collector 25.

Titania particles are applied as the nonconductive particles onto the negative electrode mixture layer 26. By using a solution of polymethylstyrene in which the titania particles are dispersed, the nonconductive particles were applied onto the mixture layer 26 by the dipping method.

The negative electrode collector 25, on which the negative electrode mixture layer 26 coated with the nonconductive particles was formed, was pressed by the roll press and was then dried to produce an electrode. By punching the electrode, there was obtained a disk-type negative electrode 24 having a diameter of 16 mm.

By observing the surface of the negative electrode 24 by the SEM, it was confirmed that the nonconductive particles are buried only at the top surface of the negative electrode mixture layer 26. It was also confirmed that none of the nonconductive particles exist in the inner layer of the mixture layer 26. By observing the cross sections of the mixture layer 26 by the SEM, it was recognized that the nonconductive particles exist in a zone with a depth ranging from 1 to 20 μm relative to the surface of the mixture layer 26.

Example 3

A coin-type lithium secondary battery produced in Example 3 differs, as in Example 2, from that of Example 1 only in the structure of the negative electrode 24. Hence, description will be given only of a method of producing the negative electrode 24.

In the negative electrode 24 of Example 3, the nonconductive particles were buried in the fine depressions formed at a surface of the negative electrode mixture layer 26.

The negative electrode active material was prepared by mechanically mixing graphite having a mean particle diameter of 10 μm with carbon black having a mean particle diameter of 0.04 μm and a specific surface area of 40 m²/g with a weight ratio of 95:5. The carbon black also serves as a conductive additive. The binder was prepared by dissolving a 8 wt % of polyvinylidene floride in N-methylpyrolidone.

The carbon material including the graphite and the carbon black was mixed with polyvinylidene floride with a weight ratio of 90:10. This mixture was fully kneaded into a negative electrode slurry. The negative electrode slurry was applied onto one surface of the negative electrode collector 25 including a 10 μm thick aluminum foil. By provisionally drying the slurry, the negative electrode mixture layer 26 was formed on the negative electrode collector 25.

By use of a nano-imprint mold roll having a large number of pyramid-shaped projections, fine depressions are formed on the surface of the negative electrode mixture layer 26.

Alumina particles were applied as the nonconductive particles onto the negative electrode mixture layer 26 in which fine depressions are formed at the surface. By using a solution of polymethylstyrene in which the alumina particles were dispersed, the nonconductive particles were applied onto the negative electrode mixture layer 26 by the spraying method.

The negative electrode collector 25, on which the negative electrode mixture layer 26 coated with nonconductive particles was formed, was pressed by the roll press and was then dried to produce an electrode. By punching the electrode, there was obtained a disk-type negative electrode 24 having a diameter of 16 mm.

By observing the surface of the negative electrode 24 by the SEM, it was confirmed that nonconductive particles are buried only at the top surface of the negative electrode mixture layer 26. It was also confirmed that none of the nonconductive particles exist in the inner layer of the mixture layer 26. By observing the cross sections of the mixture layer 26 by the SEM, it was recognized that the nonconductive particles exist in a zone with a depth ranging from 1 to 20 μm relative to the surface of the mixture layer 26.

Example 4

A coin-type lithium secondary battery produced in Example 4 differs, as in Examples 2 and 3, from that of example 1 only in the structure of the negative electrode 24. Hence, description will be given only of a method of producing the negative electrode 24.

The negative electrode active material was prepared by mechanically mixing graphite having a mean particle diameter of 10 μm with carbon black having a mean particle diameter of 0.04 μm and a specific surface area of 40 m²/g with a weight ratio of 95:5. The carbon black also serves as a conductive additive. The binder was prepared by dissolving a 8 wt % of polyvinylidene floride in N-methylpyrolidone.

The carbon material including the graphite and the carbon black was mixed with polyvinylidene floride with a weight ratio of 90 to 10. This mixture was fully kneaded into a negative electrode slurry. The negative electrode slurry was applied onto one surface of the negative electrode collector 25 including a 10 μm thick aluminum foil. By provisionally drying the slurry, the negative electrode mixture layer 26 was formed on the negative electrode collector 25.

Alumina particles were applied as the nonconductive particles onto the negative electrode mixture layer 26. A solution of polymethylstyrene in which the alumina particles were dispersed was applied onto the mixture layer 26 by the spin coating method thereby to apply the nonconductive particles onto the mixture layer 26. In this process, five negative electrode collectors in which the negative electrode mixture layer 26 was formed were produced. By changing the spin coating condition labeled as Examples 4-1 to 4-5, the nonconductive particles were applied to these collectors respectively. The spin coat was conducted for 30 seconds at each spin coating speed listed in Table 1.

TABLE 1

| Example | Spin coating speed (rpm) |
|---------|--------------------------|
| 4-1 | 10 |
| 4-2 | 100 |
| 4-3 | 200 |
| 4-4 | 500 |
| 4-5 | 1000 |

The five negative electrode collectors 25, on which the negative electrode mixture layer 26 was formed, were pressed by the roll press, and were then dried to produce electrodes. By punching the five electrodes, there were obtained the disk-type negative electrodes 24 having a diameter of 16 mm.

By observing the surface of the negative electrodes 24 by the SEM, it was confirmed that the nonconductive particles are buried only at the top surface of the negative electrode mixture layer 26 in each of Examples 4-1 to 4-5. It was also confirmed that none of the nonconductive particles exist in the inner layer of the mixture layer 26. By observing the cross sections of the mixture layer 26 by the SEM, it was recognized that the nonconductive particles exist in a zone with a depth ranging from 1 to 20 μm relative to the surface of the mixture layer 26 in Examples 4-1 to 4-5.

Example 5

A coin-type lithium secondary battery produced in Example 5 differs, as in Examples 2 to 4, from that of Example 1 only in structure of the negative electrode 24. Hence, description will be given only of a method of producing the negative electrode 24.

The negative electrode active material was prepared by mechanically mixing graphite having a mean particle diameter of 10 μm with carbon black having a mean particle diameter of 0.04 μM and a specific surface area of 40 $m^2/g$ with a weight ratio of 95:5. The carbon black also serves as a conductive additive. The binder was prepared by dissolving a 8 wt % of polyvinylidene floride in N-methylpyrolidone.

The carbon material including the graphite and the carbon black was mixed with polyvinylidene floride with a weight ratio of 90:10. This mixture was fully kneaded into a negative electrode slurry. The negative electrode slurry was applied onto one surface of the negative electrode collector 25 including a 10 μm thick aluminum foil. By drying the slurry, the negative electrode mixture layer 26 was formed on the negative electrode collector 25.

Alumina particles were applied as the nonconductive particles onto the negative electrode mixture layer 26. A solution of polymethylstyrene in which the alumina particles were dispersed was applied onto the mixture layer 26 by the spraying method.

The negative electrode collector 25, on which the negative electrode mixture layer 26 was formed, was dried without being pressed by the roll press, to produce electrodes. By punching the electrode, there was obtained the disk-type negative electrode 24 having a diameter of 16 mm.

Figure 5:
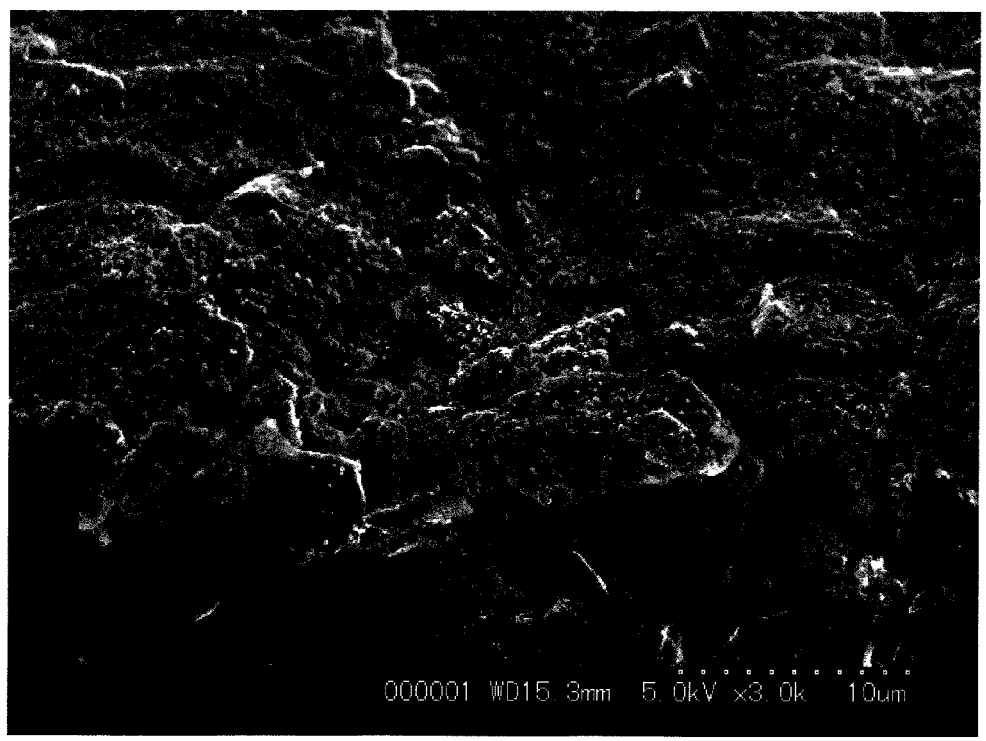
FIG. 5 is a tilted Scanning Electron Microscope (SEM) image of a negative electrode in which nonconductive particles are bound on a surface of a mixture layer.

In Example 5, the negative electrode collector 25, on which the negative electrode mixture layer 26 was formed, was not pressed. Hence, the nonconductive particles were bound on the surface of the negative electrode mixture layer 26, being not buried in the top layer of the mixture layer 26. By observing the cross sections of the mixture layer 26 by the SEM, it was recognized that the nonconductive particles exist in a zone with a height ranging from 1 to 20 μm relative to the surface of the mixture layer 26 as illustrated in FIG. 3. FIG. 5 is an image taken by the SEM of a negative electrode of Example 5.

Example 6

A coin-type lithium secondary battery produced in Example 6 differs, as in Examples 2 to 5, from that of Example 1 only in the structure of the negative electrode 24. Hence, description will be given only of a method of producing the negative electrode 24.

The negative electrode active material was prepared by mechanically mixing graphite having a mean particle diameter of 10 μm with carbon black having a mean particle diameter of 0.04 μm and a specific surface area of 40 $m^2/g$ with a weight ratio of 95 to 5. The carbon black also serves as a conductive additive. The binder was prepared by dissolving a 8 wt % of polyvinylidene floride in N-methylpyrolidone.

The carbon material including the graphite and the carbon black was mixed with polyvinylidene floride with a weight ratio of 90:10. This mixture was fully kneaded into a negative electrode slurry. The negative electrode slurry was applied onto one surface of the negative electrode collector 25 including a 10 μm thick aluminum foil. By provisionally drying the slurry, the negative electrode mixture layer 26 was formed on the negative electrode collector 25.

Alumina particles were applied as the nonconductive particles onto the negative electrode mixture layer 26. The aluminum particles were mixed with the binder beforehand prepared by dissolving a 8 wt % of polyvinylidene floride in N-methylpyrolidone with a weight ratio of 90:10. The obtained mixture was applied onto the negative electrode mixture layer 26 by the spin coating method thereby to apply the nonconductive particles onto the mixture layer 26. In this process, five negative electrode collectors 25 in which the negative electrode mixture layer 26 was formed were produced. By changing the spin coating condition labeled as Examples 6-1 to 6-5, the nonconductive particles were applied to these collectors respectively. The spin coat was conducted for 30 seconds at each spin coating speed listed in Table 2.

TABLE 2

| Example | Spin coating speed (rpm) |
|---------|--------------------------|
| 6-1 | 20 |
| 6-2 | 200 |
| 6-3 | 300 |
| 6-4 | 500 |
| 6-5 | 1000 |

The five negative electrode collectors 25, on which the negative electrode mixture layer 26 was formed, were dried without being pressed by the roll press, to produce electrodes. By punching the electrodes, there were obtained the disk-type negative electrodes 24 having a diameter of 16 mm.

In Example 6, as in Example 5, each negative electrode collector 25, on which the negative electrode mixture layer 26 coated with the nonconductive particles was formed, was not pressed as in Example 5. Hence, the nonconductive particles were bound on the surface of the negative electrode mixture layer 26, being not buried in the top layer of the mixture layer 26. By observing the cross sections of the mixture layer 26 by the SEM, it was recognized that the nonconductive particles exist in a zone with a height ranging from 1 to 20 μm relative to the surface of the mixture layer 26 in Examples 6-1 to 6-5 as illustrated in FIG. 3.

Comparative Example

A coin-type lithium secondary battery produced in Comparative Example differs, as in Examples 2 to 6, from that of Example 1 only in the structure of the negative electrode 24. Hence, description will be given only of a method of producing the negative electrode 24.

The negative electrode active material was prepared by mechanically mixing graphite having a mean particle diameter of 10 μm with carbon black having a mean particle diameter of 0.04 μm and a specific surface area of 40 $m^2/g$ with a weight ratio of 95:5. The carbon black also serves as a conductive additive. The binder was prepared by dissolving a 8 wt % of polyvinylidene floride in N-methylpyrolidone.

The carbon material including the graphite and the carbon black was mixed with polyvinylidene floride with a weight ratio of 90:10. This mixture was fully kneaded into a negative electrode slurry. The negative electrode slurry was applied onto one surface of the negative electrode collector 25 including a 10 μm thick aluminum foil. By drying the slurry, the negative electrode mixture layer 26 was formed on the negative electrode collector 25.

The negative electrode collector 25, on which the negative electrode mixture layer 26 was formed, was pressed by the roll press to produce an electrode. By punching the electrode, there was obtained a disk-type negative electrode 24 having a diameter of 16 mm.

In the negative electrode 24 produced in Comparative Example, nonconductive particles exist neither in the top layer nor on the surface of the negative electrode mixture layer 26.

Cycle tests were conducted as below by use of the coin-type lithium secondary batteries of Examples 1 to 6 and Comparative Example.

Cycle Test Procedure:

Each of the coin-type lithium secondary batteries of Examples 1 to 6 and Comparative Example was charged and discharged at 45° C. under the following conditions. First, the battery was charged with a fixed current, i.e., with a current density of 1 $mA/cm^2$ up to 4.1 V. Thereafter, a constant-current constant-voltage charging operation at 4.1 V was conducted for three hours. When a rest period of one hour passed after the charging operation was finished, the battery was discharged with a fixed current of 1 $mA/cm^2$ down to 3 V. When a rest period of two hours passed after the discharging operation was finished, a next charging operation was carried out. Thus, the cycle test conducted includes repeatedly a cycle of a charge phase, a rest phase, a discharge phase, and a rest phase. The discharge capacity of the battery in the first cycle of the cycle test was compared with that in the 1000th cycle of the cycle test.

Table 3 represents the results of the cycle tests. For each lithium secondary battery of Examples 1 to 6 and Comparative Example, the discharge capacity of the first cycle is indicated as a relative value assuming that the discharge capacity of the first cycle of the first embodiment is unity. For each secondary battery, a ratio of the discharge capacity of the 1000th cycle to that of the first cycle is listed as a discharge capacity retaining ratio.

TABLE 3

| | Discharge capacity at first cycle | Discharge capacity retaining ratio at 1000th cycle |
|---|---|---|
| Example 1 | 1 | 73 |
| Example 2 | 0.95 | 77 |
| Example 3 | 1.1 | 68 |
| Example 4-1 | 0.87 | 48 |
| Example 4-2 | 0.88 | 58 |
| Example 4-3 | 0.88 | 74 |
| Example 4-4 | 0.9 | 70 |
| Example 4-5 | 0.91 | 59 |
| Example 5 | 1.05 | 65 |
| Example 6-1 | 0.85 | 52 |
| Example 6-2 | 0.86 | 57 |
| Example 6-3 | 0.89 | 73 |
| Example 6-4 | 0.91 | 71 |
| Example 6-5 | 0.9 | 61 |
| Comparative Example | 1.2 | 48 |

For each lithium secondary battery of Examples 1 to 6, it was confirmed that by disposing the nonconductive particles in the top layer or on the surface of the negative electrode mixture layer, the discharge capacity retaining ratio of the 1000th cycle is improved as compared with that of Comparative Example in which the nonconductive particles are not employed. However, in Example 4-1, the discharge capacity retaining ratio of the 1000th cycle is kept unchanged as compared with that of Comparative Example. This is because of the influence of the volume ratio of the nonconductive particles in the top layer of the negative electrode mixture layer, i.e., the volume ratio of the nonconductive particles in the top layer of the negative electrode mixture layer to the total volume of the nonconductive particles and the negative electrode active material therein, which will be described below.

Examples 4-1 to 4-5 differ from each other in the spin coating speed to apply the nonconductive particles onto the negative electrode mixture layer. Hence, the volume ratio of the nonconductive particles in the top layer of the negative electrode mixture layer varies among Examples 4-1 to 4-5. To obtain the volume ratio of the nonconductive particles having a diameter of 20 μm or less, an image of the surface of the negative electrode mixture layer was taken by the SEM and an obtained image was processed. The obtained volume ratio was 95% for Example 4-1, 80% for Example 4-2, 70% for Example 4-3, 47% for Example 4-4, and 18% for Example 4-5.

The volume ratio of the nonconductive particles having a diameter of 20 μm or less is 95% for the negative electrode mixture layer of Example 4-1. When the volume ratio of the nonconductive particles is 95% or more, a layer of the nonconductive particles is formed on the negative electrode mixture layer. Hence, it is likely that the transfer of lithium ions is hindered and the charge/discharge capacity is reduced. Accordingly, it is considered that the discharge capacity retaining ratio for the 1000th cycle in Example 4-1 is not different from that of Comparative Example not employing the nonconductive particles.

Therefore, in a situation where the nonconductive particles are buried in the top layer of the negative electrode mixture layer as in Example 4, when the volume ratio of the nonconductive particles in the top layer of the negative electrode mixture layer ranges from 20 to 80%, it is possible to suppress the reduction in the discharge capacity.

Also for the negative electrode mixture layers of Examples 5 and 6, an image of the surface of the negative electrode mixture layer was taken by the SEM and an obtained image was processed to obtain the volume ratio of the nonconductive particles having a diameter of 20 μm or less. The volume ratio of the nonconductive particles in each of Examples 5 and 6 is a volume ratio of the nonconductive particles on the surface of the negative electrode mixture layer to the total volume of the nonconductive particles and the gaps on the surface.

The obtained volume ratio of the nonconductive particles having a diameter of 20 μm or less is 70% in Example 5.

According to the result of Example 6, the volume ratio of the nonconductive particles bound on the surface of the negative electrode mixture layer varies depending on the spin coating condition. The volume ratio of the nonconductive particles having a diameter of 20 μm or less was 89% in Example 6-1, 79% in Example 6-2, 73% in Example 6-3, 45% in Example 6-4, and 23% in Example 6-5.

Although not listed in Table 3, in a situation wherein the nonconductive particles are bound on the surface of the negative electrode mixture layer as in Examples 5 and 6, when the volume ratio of the nonconductive particles is 95% or more, a layer of the nonconductive particles is also formed on the negative electrode mixture layer. Hence, it is likely that the transfer of lithium ions is hindered and the charge/discharge capacity is reduced. Therefore, in a situation wherein the nonconductive particles are bound on the surface of the negative electrode mixture layer as in Examples 4, when the volume ratio of the nonconductive particles on the surface of the negative electrode mixture layer ranges from 20 to 90%, it is possible to suppress the reduction in the discharge capacity.

As explained above, in the nonaqueous lithium secondary battery according to the present invention, it was confirmed that the cycle life of the secondary battery was improved by discontinuously mixing the nonconductive particles in the top layer or on the surface of the negative electrode mixture layer. The present invention is particularly effective for a lithium secondary battery with large discharge capacity.

The nonaqueous lithium secondary battery according to the present invention is applicable to any appropriate fields. For example, it may be adopted as a power source of portable information communication apparatuses such as a personal computer, a word processor, a cordless handset, an electronic book player, a cellular phone, a car phone, a handy terminal, a transceiver, and a portable radio apparatus. Also, it may be employed as a power source of various portable apparatuses such as a portable copying machine, an electronic notebook, an electronic calculator, a liquid crystal television set, a radio set, a tape recorder, a headphone stereo player, a portable Compact Disk (CD) player, a video movie player, an electric shaver, an electronic translator, a voice input apparatus, and a memory card. In addition, it may be utilized as a power source of family appliances such as a refrigerator, an air conditioner, a television set, a stereo set, a hot water supply system, a microwave oven, a dish washer, a drier, a washing machine, an illuminator, and a toy. In industrial fields, it may be employed as a power source of, for example, medical appliances, a construction machine, a power storage system, and an elevator. Also, it may be adopted as a power source of vehicles such as an electric car, a hybrid electric car, and a golf cart.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A nonaqueous lithium secondary battery comprising a positive electrode and a negative electrode capable of intercalating and releasing lithium ions, and a separator for separating the positive electrode from the negative electrode, wherein:
  the negative electrode comprises a collector and a negative electrode mixture layer formed on the collector, the negative electrode mixture layer comprising at least a negative electrode active material and a binder;
  a top layer comprising a mixture of nonconductive particles and the negative electrode active material is located on the negative electrode mixture layer, and the nonconductive particles exist only in the top layer; and
  a depth of the top layer ranging from 1 to 20 μm; wherein the nonconductive particles include particles of at least one kind selected from alumina, silica, titania, and zirconia.

2. A nonaqueous lithium secondary battery according to claim 1, wherein, among the nonconductive particles existing in the top layer, a volume ratio of nonconductive particles having a diameter equal to or less than 20 μm to a total volume of all the nonconductive particles and the negative electrode active material existing in the top layer of the negative electrode mixture layer ranges from 20 to 80%.

3. A nonaqueous lithium secondary battery according to claim 1, wherein the nonconductive particles are buried as nonconductive particles having cluster structure.

4. A nonaqueous lithium secondary battery comprising a positive electrode and a negative electrode capable of intercalating and releasing lithium ions, and a separator for separating the positive electrode from the negative electrode, wherein:
  the negative electrode comprises a collector and a negative electrode mixture layer formed on the collector, the negative electrode mixture layer comprising at least a negative electrode active material and a binder;
  a mixture of nonconductive particles and gaps is located on a surface of the negative electrode mixture layer;
  the nonconductive particles are bound on the surface of the negative electrode mixture layer;
  a height of the mixture of the nonconductive particles and the gaps ranging from 1 to 20 μm, and the nonconductive particles exist only in the height of the mixture of the nonconductive particles and gaps ranging from 1 to 20 μm; and
  among the nonconductive particles existing on the surface of the negative electrode mixture layer, a volume ratio of nonconductive particles having a diameter equal to or less than 20 μm to a total volume of all the mixture of the nonconductive particles and the gaps ranges from 20 to 90%; wherein the nonconductive particles include particles of at least one kind selected from alumina, silica, titania, and zirconia.

5. A nonaqueous lithium secondary battery according to claim 3, wherein the nonconductive particles include particles of at least one kind selected from alumina, silica, titania, and zirconia.

6. A nonaqueous lithium secondary battery according to claim 1, wherein the separator is a ceramic separator.

7. A nonaqueous lithium secondary battery according to claim 4, wherein the separator is a ceramic separator.

* * * * *